United States Patent
Gross et al.

(10) Patent No.: US 8,730,503 B2
(45) Date of Patent: May 20, 2014

(54) METHODS AND SYSTEMS FOR BALANCING JOB ASSIGNMENTS TO MACHINES IN A PRODUCTION ENVIRONMENT

(75) Inventors: Eric Michael Gross, Rochester, NY (US); Timothy Wayne Jacobs, Fairport, NY (US); Jack Gaynor Elliot, Penfield, NY (US); Sharath Srinivas, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 234 days.

(21) Appl. No.: 13/235,958

(22) Filed: Sep. 19, 2011

(65) Prior Publication Data
US 2013/0070285 A1    Mar. 21, 2013

(51) Int. Cl.
*G06F 3/12*    (2006.01)

(52) U.S. Cl.
USPC ........ 358/1.15; 358/1.14; 715/716; 705/7.35; 705/52

(58) Field of Classification Search
CPC ...... G06F 9/5038; G06F 9/505; G06F 9/5083
USPC ............................................... 358/1.15, 1.14
See application file for complete search history.

(56) References Cited

U.S. PATENT DOCUMENTS

| | | | |
|---|---|---|---|
| 7,797,189 B2 | 9/2010 | Rai et al. | |
| 7,925,460 B2 | 4/2011 | Rai et al. | |
| 8,379,255 B2 * | 2/2013 | Rai et al. | 358/1.15 |
| 2004/0181592 A1 * | 9/2004 | Samra et al. | 709/220 |
| 2008/0285067 A1 | 11/2008 | Rai | |
| 2012/0099139 A1 | 4/2012 | Zhou et al. | |
| 2013/0128302 A1 | 5/2013 | Rai et al. | |

* cited by examiner

*Primary Examiner* — Benny Q Tieu
*Assistant Examiner* — Juan M Guillermety
(74) *Attorney, Agent, or Firm* — Fox Rothschild LLP (57) ABSTRACT

Methods and systems of balancing job assignments to a plurality of machines are disclosed. A computing device receives multiple jobs each having a job size and determines a job order for the jobs based on each job's job size. A machine order is determined for a plurality of machines based on a setup time and a processing rate associated with each machine. The computing device assigns one or more jobs to each machine based on the job order and the machine order such that a maximum total processing time for the machines is minimized. A total processing time for each machine is determined based on the number of jobs and the cumulative job size of the jobs assigned to the machine, and the setup time and the processing time associated with the machine. The maximum total processing time is the largest of the total processing times for the machines.

21 Claims, 4 Drawing Sheets

METHODS AND SYSTEMS FOR BALANCING JOB ASSIGNMENTS TO MACHINES IN A PRODUCTION ENVIRONMENT

BACKGROUND

Machines, such as those in a print shop environment, are often used to perform particular jobs and can be characterized as having jobs in a queue. Jobs to be performed by a machine can have vastly differing job sizes. For example, jobs in a print shop environment can have vastly different numbers of pages to be printed, inserted, bound, etc. In addition, a given job is often capable of being processed by a number of different machines. The machines themselves often operate at different processing rates and have different set up times. Even if the machines operate at the same processing rate, machines can differ with respect to an effective processing rate due to different reliability behaviors. Conventionally, assigning jobs to machines is performed heuristically or by intuition and based on perceived machine rates, which could be erroneous or not fully comprehensive. As such, job make-span (i.e., the total time required to complete a set of jobs) can be less than optimal in current production environments.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In an embodiment, a method of balancing job assignments to a plurality of machines in a production environment may include receiving, by a computing device, a plurality of jobs each having a job size; determining, by the computing device, a job order for the plurality of jobs based on the job size for each job; determining, by the computing device, a machine order for a plurality of machines based on a setup time and a processing rate associated with each of the plurality of machines; and assigning, by the computing device, one or more jobs of the plurality of jobs to each of the plurality of machines such that a maximum total processing time for the plurality of machines is minimized. A total processing time for a machine is determined based on the number of jobs assigned to the machine, the setup time associated with the machine, the processing rate associated with the machine and the cumulative job size of the jobs assigned to the machine. The maximum total processing time for the plurality of machines is the largest of the total processing times for each of the plurality of machines. The jobs are assigned to each of the plurality of machines based on the job order and the machine order.

A method of balancing job assignments to a plurality of machines in a production environment may include receiving, by a computing device, a plurality of jobs each having a job size; determining, by the computing device, a job order for the plurality of jobs based on the job size for each job; determining, by the computing device, a machine order for a plurality of machines based on a setup time and a processing rate associated with each of the plurality of machines; determining, by the computing device, one or more job threshold parameters based on the job sizes for the plurality of jobs, the job order, the setup times and the processing rates for the plurality of machines, and the machine order; and assigning, by the computing device, the plurality of jobs to the plurality of machines such that a maximum total processing time for the plurality of machines is minimized. A number of job threshold parameters is one less than a number of machines in the plurality of machines. A total processing time for a machine is determined based on the one or more threshold parameters, the setup time associated with the machine, the processing rate associated with the machine and the cumulative job size of the jobs assigned to the machine. The maximum total processing time for the plurality of machines is the largest total processing time for the plurality of machines. The jobs are assigned to the plurality of machines based on the one or more job threshold parameters.

A system for balancing job assignments to a plurality of machines in a production environment may include a computing device and a non-transitory computer-readable storage medium in operable communication with the computing device. The computer-readable storage medium contains one or more instructions that, when executed, cause the computing device to receive a plurality of jobs each having a job size, determine a job order for the plurality of jobs based on the job size for each job, determine a machine order for a plurality of machines based on a setup time and a processing rate associated with each of the plurality of machines, and assign one or more jobs of the plurality of jobs to each of the plurality of machines such that a maximum total processing time for the plurality of machines is minimized. A total processing time for a machine is determined based on the number of jobs assigned to the machine, the setup time associated with the machine, the processing rate associated with the machine and the cumulative job size of the jobs assigned to the machine. The maximum total processing time for the plurality of machines is the largest of the total processing times for each of the plurality of machines. The jobs are assigned to each of the plurality of machines based on the job order and the machine order.

DETAILED DESCRIPTION

The following terms shall have, for the purposes of this application, the respective meanings set forth below.

A "computing device" refers to a computer, a processor and/or any other component, device or system that performs one or more operations according to one or more programming instructions. An exemplary computing device is described in reference to FIG. 4.

A "job" refers to a logical unit of work that is to be completed for a customer. In a print production environment, a job may include one or more print jobs from one or more clients.

A "job order" refers to a manner in which a plurality of jobs are ordered. For example, a plurality of jobs may be ordered based on their job sizes from smallest to largest. A job order may be evidenced by assigning an ordered sequence of identifiers, such as numbers, to the plurality of jobs to denote their position in the job order.

A "job size" refers to a number of discrete outputs for a job. For example, a print job may require production of 100 printed sheets. Such a print job may be classified as having a job size of 100. Alternate methods of determining job size may also be used within the scope of this disclosure. For example, a job size unit may be a business card, a book, an impression or any other unit of measurement. A "cumulative job size" refers to a sum of the job sizes for a plurality of jobs. For example, a cumulative job size for jobs 1 through 10 in a job order equals the sum of the job sizes for jobs 1 through 10.

A "job threshold parameter" refers to a threshold for jobs in a job order to be assigned to a particular machine. For example, if a smallest job threshold parameter is 10 and a second smallest job threshold parameter is 20, then jobs 1 through 10 in a job order may be assigned to a first machine, and jobs 11 through 20 in the job order may be assigned to a second machine.

A "machine" refers to a device used to perform a task. In a print production device, a machine may include, without limitation, a print device.

A "machine order" refers to a manner in which a plurality of machines are ordered. For example, a plurality of machines may be ordered based on an opportunity cost associated with each machine, from smallest to largest. An exemplary opportunity cost is discussed below. A machine order may be evidenced by assigning an ordered sequence of identifiers, such as numbers, to the plurality of machines to denote their position in the machine order.

A "print device" refers to a device capable of performing one or more print-related functions. For example, a print device may include a printer, a scanner, a copy machine, a multifunction device, a collator, a binder, a cutter or other similar equipment. A "multifunction device" is a device that is capable of performing two or more distinct print-related functions. For example, a multifunction device may have print and scan capabilities.

A "print job" refers to a job processed in a print production environment. For example, a print job may include producing credit card statements corresponding to a certain credit card company, producing bank statements corresponding to a certain bank, printing a document, or the like. Although the disclosed embodiments pertain to print jobs, the disclosed methods and systems can be applied to jobs in general in other production environments, such as automotive manufacturing, semiconductor production and the like.

A "processing rate" refers to a speed with which a machine performs an operation. An exemplary processing rate for a print device may be measured in pages per minute, although other units of measurement may also be used within the scope of this disclosure.

A "setup time" refers to an amount of time required to prepare a machine so that the machine can perform an operation. For example, a print device may require one or more pre-processing steps to be performed prior to performing a print job that require a setup time of 4 minutes.

A "total processing time" refers to an amount of time required to setup and perform one or more jobs assigned to a machine. A "maximum total processing time" refers to the largest total processing time of a plurality of total processing times determined for a plurality of machines.

As used herein, the terms "sum," "product" and similar mathematical terms are construed broadly to include any method or algorithm in which a single datum is derived or calculated from a plurality of input data.

Figure 1:
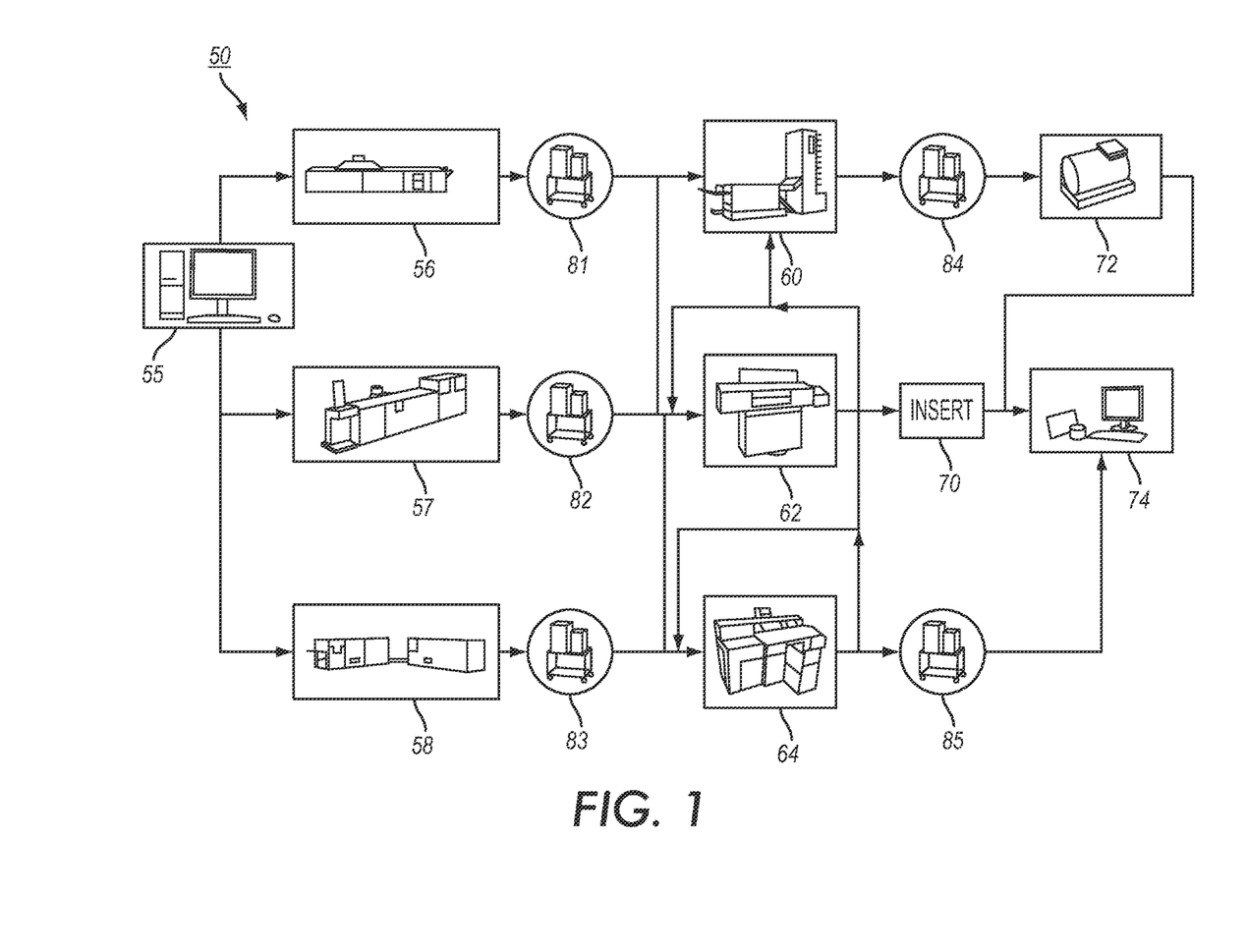
FIG. 1 depicts an exemplary production environment according to an embodiment.

FIG. 1 depicts an exemplary production environment 50, in this case, exemplary elements of a print shop. Print jobs may enter the print shop manually or electronically and be collected at an electronic submission system 55 such as a computing device and/or scanner. Jobs are sorted and batched at the submission system or another location before being delivered to one or more print engines such as a color printer 56, black-and-white printer 57 and/or a continuous feed printer 58. Jobs may exit the print engine and be delivered to one or more finishing devices or areas such as a collator 60, cutter 62, and/or binder 64. The finishing areas may include automatic or manual areas for such finishing activities and they also may include an automatic or manual inserter 70. Finally, jobs may move to a postage metering station 72 and/or shipping station 74. Jobs may move from one location to another in the print shop by automatic delivery or manual delivery such as by hand or by one or more paper carts 81-85. Although the disclosed embodiments pertain to document production systems, the disclosed methods and systems can be applied to production systems in general.

Figure 2:
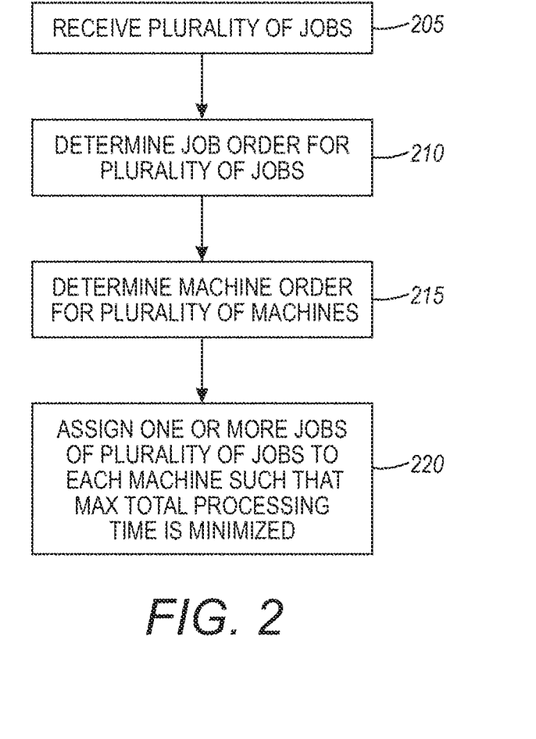
FIG. 2 depicts a flow diagram for an exemplary method of assigning jobs to machines in a production environment according to an embodiment.

FIG. 2 depicts a flow diagram for an exemplary method of assigning jobs to machines in a production environment according to an embodiment. As shown in FIG. 2, a plurality of jobs may be received 205 by a computing device. Each job of the plurality of jobs may have a corresponding job size. For example, in a print production environment, each job may refer to a print job. A job size corresponding to a print job may refer to a number of impressions, pages, sheets or the like to be printed, bound, collated, cut, inserted or the like by a particular type of machine or print device. In an embodiment, the job sizes for the plurality of jobs may have significant variability from one job to the next. In an embodiment, the plurality of jobs may be accumulated over time and received 205 by the computing device at a particular time.

A job order for the plurality of jobs may be determined 210 by the computing device. The job order may represent an ordering of the jobs for future analysis. In an embodiment, the job order for the plurality of jobs may be a sequential listing from the job having the smallest job size to the job having the largest job size. For example, four print jobs having job sizes of 100, 34, 4 and 5 may be placed in a job order such that the job having job size 4 is the first job, the job having job size 5 is the second job, the job having job size 34 is the third job and the job having job size 100 is the fourth job. Jobs having different job sizes than those described and/or different numbers of jobs may be placed in a job order within the scope of this disclosure. In addition, alternate methods of ordering jobs, such as ordering jobs from the job having the largest job size to the job having the smallest job size, may also be performed within the scope of this disclosure.

Figure 3:
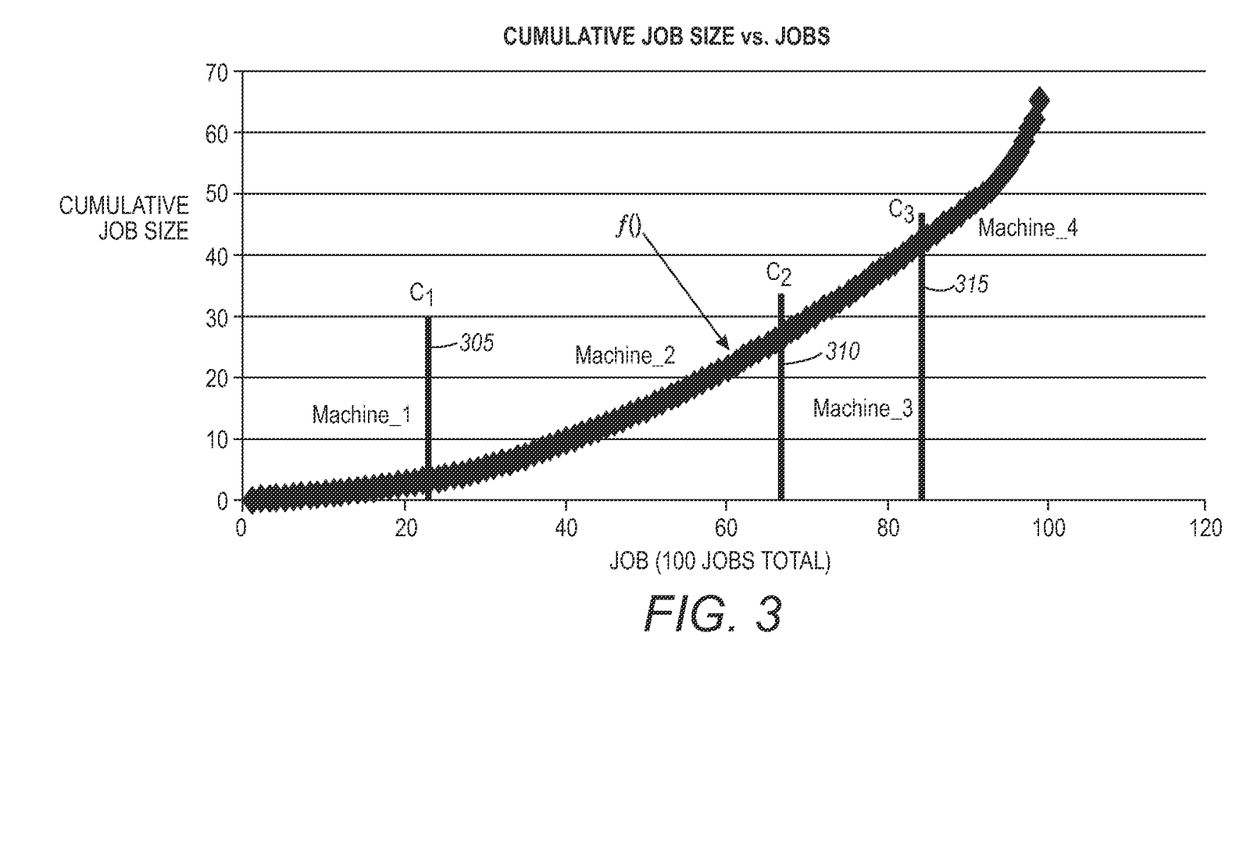
FIG. 3 depicts an exemplary graph of cumulative job size and job count thresholds for a plurality of machines based on a job order according to an embodiment.

FIG. 3 depicts an exemplary graph of cumulative job size and job threshold parameters for a plurality of machines based on a job order according to an embodiment. As shown in FIG. 3, the set of jobs are ordered from smallest job size to largest job size. Each job is indexed along the x-axis by its ordered job number, j. The y-axis represents the accumulated job size, f(j), for the jobs up to the particular job, where j=1, 2, 3, . . . , N (the total number of jobs). As such, f(1) is equal to the job size of job 1; f(3) is equal to the sum of the job sizes of jobs 1, 2 and 3; and f(N) is equal to the sum of the job sizes for all jobs in the set of jobs.

Referring back to FIG. 2, a machine order for a plurality of machines may also be determined 215 by the computing device. The plurality of machines may each be able to process a particular job. Each machine may have an associated setup time and processing rate, which may differ from machine to machine. The machine order may be determined 215 by determining an opportunity cost for each machine. In an embodiment, the opportunity cost may be determined by determining the amount of work that could have been performed by a machine during the time required to set up the machine to perform a job. In an embodiment, the opportunity cost is equal to the product of the setup time for the machine and the processing rate for the machine. For example, if it takes 15 minutes to set up a printing device and the printing device is capable of printing 100 pages per minute, the opportunity cost for the printing device is 1500 pages. In an embodiment, the machine order may result in an ordering of machines from the machine having the smallest opportunity cost to the machine having the largest opportunity cost. Alternate methods of ordering machines, such as ordering machines from the machine having the largest opportunity cost to the machine having the smallest opportunity cost, may also be performed within the scope of this disclosure.

In an embodiment, the processing rates of two machines may be related to each other by a single scaling factor. For example, if the processing rate of a first machine is $Rate_1$ and the processing rate of a second machine is $Rate_2$, the processing rates of the two machines may be linearly related by a constant $\alpha$ (i.e., $Rate_1 = \alpha * Rate_2$).

Referring back to FIG. 3, job threshold parameters may be determined in order to split the function $f()$. As shown in FIG. 3, if the plurality of jobs are to be assigned to four machines, three job threshold parameters, such as 305, 310 and 315, may be determined. In general, the number of job threshold parameters may be one less than the number of machines to which the plurality of jobs may be assigned. Machines may be assigned to one of a plurality of job sections. For example, in the embodiment shown in FIG. 3, a first machine may be assigned to a portion of the plurality of jobs having ordered job numbers less than or equal to a first job threshold parameter 305; a second machine may be assigned to a portion of the plurality of jobs having ordered job numbers greater than the first job threshold parameter 305 and less than or equal to a second job threshold parameter 310; a third machine may be assigned to a portion of the plurality of jobs having ordered job numbers greater than the second job threshold parameter 310 and less than or equal to a third job threshold parameter 315; and a fourth machine may be assigned to a portion of the plurality of jobs having ordered job numbers greater than the third job threshold parameter 315. In an embodiment, the machines may be ordered based on an opportunity cost for each machine, as described above. Alternate methods of assigning jobs and/or machines may be performed and/or alternate numbers of jobs and/or machines may be used within the scope of this disclosure.

Referring back to FIG. 2, one or more jobs of the plurality of jobs may be assigned 220 to each of the plurality of machines such that a maximum total processing time for the plurality of machines is minimized. In an embodiment, the plurality of jobs are assigned to each of the plurality of machines based on the job order and the machine order. A total processing time for a particular machine may be determined based on the number of jobs assigned to the machine, the setup time associated with the machine, the processing rate associated with the machine and the cumulative job size of the jobs assigned to the machine. For example, a total processing time for machine 1 in FIG. 3 may be determined based on the following formula:

$$TotalProcTime_{Machine\_1} = c_1 * st_1 + \frac{f(c_1)}{Rate_1}, \quad \text{(Eqn. 1)}$$

where $c_1$ is the first job threshold parameter 305, $st_1$ is the set up time for machine 1, $f(c_1)$ is the cumulative job size for jobs 1 through $c_i$ in the job order, and $Rate_1$ is the processing rate for machine 1. Similarly, the total processing time for machines 2-4 in FIG. 3 may be determined based on the following formulae:

$$TotalProcTime_{Machine\_2} = (c_2 - c_1) * st_2 + \frac{f(c_2) - f(c_1)}{Rate_2}, \quad \text{(Eqn. 2)}$$

$$TotalProcTime_{Machine\_3} = (c_3 - c_2) * st_3 + \frac{f(c_3) - f(c_2)}{Rate_3}, \text{ and} \quad \text{(Eqn. 3)}$$

$$TotalProcTime_{Machine\_4} = (N - c_3) * st_4 + \frac{f(N) - f(c_3)}{Rate_4}, \quad \text{(Eqn. 4)}$$

where $c_2$ and $c_3$ are the second threshold parameter 310 and third job threshold parameter 315, respectively; N is the total number of jobs; $st_2$, $st_3$ and $st_4$ are the set up times for machines 2, 3 and 4, respectively; $f(c_2)$, $f(c_3)$ and $f(N)$ are the cumulative job sizes for jobs 1 through $c_2$, jobs 1 through $c_3$, and all jobs in the job order, respectively; and $Rate_2$, $Rate_3$ and $Rate_4$ are the processing rates for machines 2, 3 and 4, respectively.

The maximum total processing time for the plurality of machines is the largest of the total processing times for each of the plurality of machines. As such, selecting job threshold parameters that minimize the maximum total processing time may result in a near-optimal make-span for the plurality of jobs.

In an embodiment, a method of determining job threshold parameters that minimize the maximum total processing time may be achieved by sequentially examining the total processing times for incremented values of the first job threshold parameter. For example, the first job threshold parameter may be set to 1. Based on the value of the first job threshold parameter, the total processing time for machine 1 may be determined by substituting in $c_1 = 1$, known values for $st_1$ and $Rate_1$ based on the specifications for machine 1, and $f(c_i)$ based on the job size for job 1. In order to achieve near equality for the total processing time for machine 1 and the total processing time for machine 2, equations 1 and 2 can be rearranged as follows:

$$c_2 * st_2 + \frac{f(c_2)}{Rate_2} = c_1 * st_1 + \frac{f(c_1)}{Rate_1} + c_1 * st_2 + \frac{f(c_1)}{Rate_2}. \quad \text{(Eqn. 5)}$$

The expression on the right of the equality is completely known, and the expression on the left is monotonic with unknown value $c_2$. Using, for example and without limitation, a binary search algorithm, $c_2$ may be found in $O(\log N)$ time.

With knowledge of $c_1$ and $c_2$, the process may be repeated by equating equations 2 and 3 (or equations 1 and 3) and conducting a search for $c_3$. The equation for the final machine may be evaluated as an outcome because the remaining number of print jobs may be assigned to the final machine.

With knowledge of $c_1$, $c_2$ and $c_3$ (or more generally $c_1 \ldots c_{N-1}$) along with the computed values of the objective function J( ) shown below for the 3-tuple, the values that minimize J( ) the make span for the set of jobs, may be selected as the values for the job threshold parameters.

$$J(c_1, c_2, c_3) = \text{Max}(\text{TotalProcTime}_{Machine\_1}, \text{TotalProcTime}_{Machine\_2}, \text{TotalProcTime}_{Machine\_3}, \text{TotalProcTime}_{Machine\_4}) \quad \text{(Eqn. 6)}$$

The value for $c_1$ may be incremented to 2, and the process described may be repeated to determine new values for $c_2$ and $c_3$. When $c_1 = N$, the process is complete, and the 3-tuple that minimizes J( ) among the N evaluated iterations is chosen.

In an embodiment, in order to improve efficiency, $c_1$ may only be incremented while a value for $\text{TotalProcTime}_{Machin\_4}$ in a given iteration exceeds 0. Once a value for $\text{TotalProcTime}_{Machine\_4}$ equals 0, no additional iterations can improve the distribution between the remaining three devices.

In an alternate embodiment, $c_i$ may only be incremented while the value of J( ) does not equal the value of $\text{TotalProcTime}_{Machine\_1}$ in a given iteration. This may be the case because the value of $\text{TotalProcTime}_{Machine\_1}$ necessarily increases in subsequent iterations of determining J( ) and, as a result, no subsequent iteration of J( ) can be less than a previous iteration.

In yet another alternate embodiment, if the objective function J( ) is convex, a binary search or steepest descent algorithm may be applied with respect to determining new values of $c_1$ for each iteration to further reduce computation time. Steepest descent algorithms are known to those of ordinary skill in the art.

Alternate methods of reducing the number of iterations of computing J( ) may also be performed within the scope of this disclosure.

Figure 4:
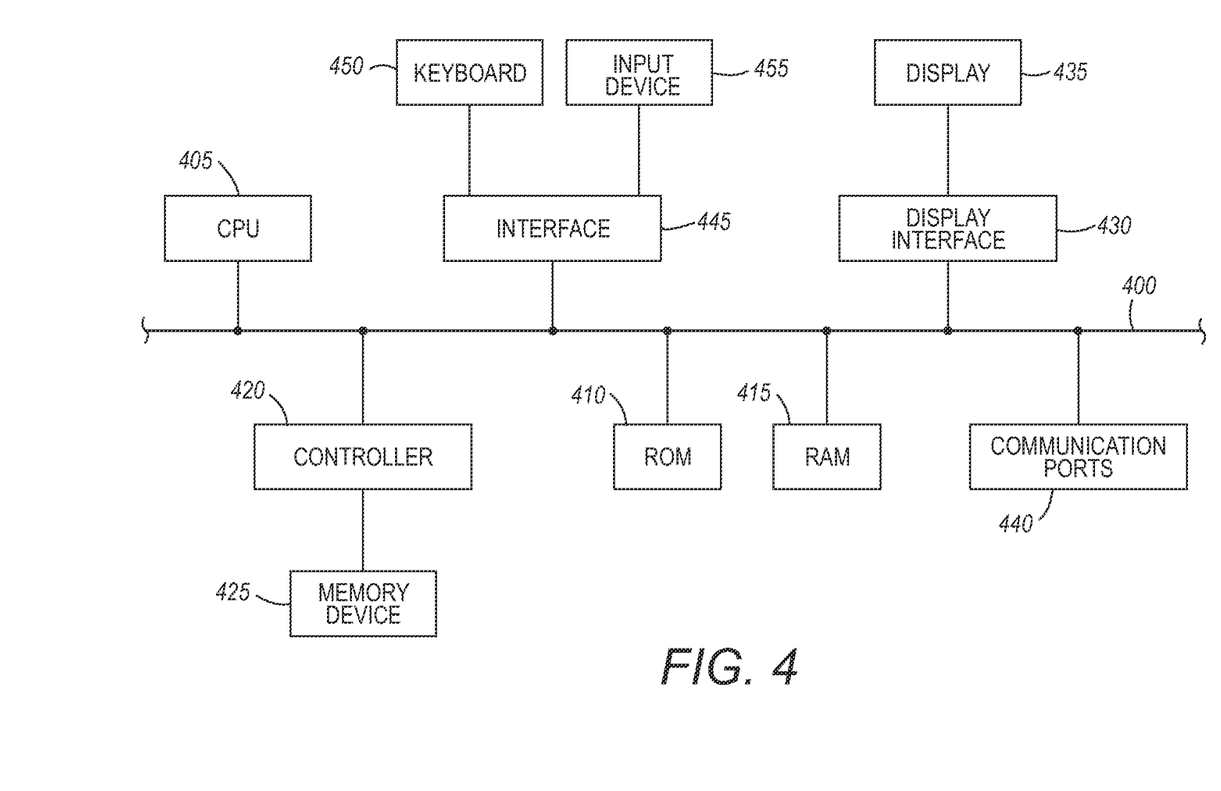
FIG. 4 depicts a block diagram of exemplary internal hardware that may be used to contain or implement program instructions according to an embodiment.

FIG. 4 depicts a block diagram of exemplary internal hardware that may be used to contain or implement program instructions, such as the process steps discussed above in reference to FIG. 2, according to embodiments. A bus 400 serves as the main information highway interconnecting the other illustrated components of the hardware. CPU 405 is the central processing unit of the system, performing calculations and logic operations required to execute a program. CPU 405, alone or in conjunction with one or more of the other elements disclosed in FIG. 4, is an exemplary processing device, computing device or processor as such terms are used within this disclosure. Read only memory (ROM) 410 and random access memory (RAM) 415 constitute exemplary memory devices (i.e., processor-readable non-transitory storage media).

A controller 420 interfaces with one or more optional memory devices 425 to the system bus 400. These memory devices 425 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 410 and/or the RAM 415. Optionally, the program instructions may be stored on a tangible computer readable medium such as a compact disk, a digital disk, flash memory, a memory card, a USB drive, an optical disc storage medium, such as a Blu-ray™ disc, and/or other non-transitory storage media.

An optional display interface 430 may permit information from the bus 400 to be displayed on the display 435 in audio, visual, graphic or alphanumeric format. Communication with external devices, such as a print device, may occur using various communication ports 440. An exemplary communication port 440 may be attached to a communications network, such as the Internet or an intranet.

The hardware may also include an interface 445 which allows for receipt of data from input devices such as a keyboard 450 or other input device 455 such as a mouse, a joystick, a touch screen, a remote control, a pointing device, a video input device and/or an audio input device.

EXAMPLE

In this example, ten jobs have been received by a print production environment to be performed on 4 machines. The parameters for the ten jobs are listed in Table 1 below. As listed, the job list represents an ordered job list. If the jobs were not ordered by job size when received, the jobs would first be ordered by job size before an ordered job number is assigned to each job.

TABLE 1

| Job Parameters | |
|---|---|
| Job # | Job Size |
| 1 | 100 |
| 2 | 120 |
| 3 | 140 |
| 4 | 300 |
| 5 | 500 |
| 6 | 1100 |
| 7 | 1200 |
| 8 | 2500 |
| 9 | 4500 |
| 10 | 8000 |

The parameters for the four machines are listed in Table 2 below.

TABLE 2

| Machine Parameters | | |
|---|---|---|
| Machine # | Setup Time (in mins.) | Proc. Rate (in pages/min.) |
| 1 | 4 | 200 |
| 2 | 2 | 90 |
| 3 | 3 | 120 |
| 4 | 4 | 90 |

The opportunity costs for machines 1 through 4 are 800 pages, 180 pages, 360 pages and 360 pages, respectively. As such, the machines may be reordered as machine 2, machine 4, machine 3 and machine 1, respectively. Based on this machine ordering, the jobs are assigned to the machines listed in Table 3 using the above-described algorithm. The job processing times identify the time to process each job.

TABLE 3

| Job Processing Data | | |
|---|---|---|
| Job # | Processed By | Job Proc. Time (in mins.) |
| 1 | Machine 2 | 3.11 |
| 2 | Machine 2 | 3.33 |
| 3 | Machine 2 | 3.56 |
| 4 | Machine 2 | 5.33 |
| 5 | Machine 2 | 7.56 |
| 6 | Machine 2 | 14.22 |
| 7 | Machine 4 | 17.33 |

TABLE 3-continued

Job Processing Data

| Job # | Processed By | Job Proc. Time (in mins.) |
|---|---|---|
| 8 | Machine 4 | 31.78 |
| 9 | Machine 3 | 40.5 |
| 10 | Machine 1 | 44 |

Based on the information in Table 3, the total processing time for each of the four machines is listed in Table 4.

TABLE 4

Total Processing Times

| Machine # | Total Proc. Time (in mins.) |
|---|---|
| 1 | 44 |
| 2 | 37.11 |
| 3 | 40.5 |
| 4 | 49.11 |

As such, the maximum total processing time for performing the jobs listed in this example is 49.11 minutes.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method of balancing job assignments to a plurality of machines in a production environment, the method comprising:
   receiving, by a computing device, a plurality of jobs, wherein each job comprises a job size;
   determining, by the computing device, a job order for the plurality of jobs based on the job size for each job;
   determining an opportunity cost associated with each of a plurality of machines by, for each machine, multiplying a setup time for the machine by a processing rate for the machine;
   determining, by the computing device, a machine order for a plurality of machines based on the opportunity cost associated with each of the plurality of machines; and
   assigning, by the computing device, one or more jobs of the plurality of jobs to each of the plurality of machines such that a maximum total processing time for the plurality of machines is minimized, wherein a total processing time for a machine is determined based on the number of jobs assigned to the machine, the setup time associated with the machine, the processing rate associated with the machine and the cumulative job size of the jobs assigned to the machine, wherein the maximum total processing time for the plurality of machines is the largest of the total processing times for each of the plurality of machines, wherein the jobs are assigned to each of the plurality of machines based on the job order and the machine order.

2. The method of claim 1 wherein determining a job order comprises ordering the plurality of jobs from a smallest job size to a largest job size.

3. The method of claim 1 wherein the total processing time for a machine is equal to the sum of (i) the product of the number of jobs assigned to the machine and the setup time associated with the machine and (ii) the cumulative job size of the jobs assigned to the machine divided by the processing rate associated with the machine.

4. The method of claim 1 wherein assigning one or more jobs comprises:
   for each of a plurality of first numbers of jobs:
      assigning the first number of jobs from the job order to a first machine in the machine order,
      determining a total processing time for the first machine,
      for each of the remaining machines in the machine order other than the last machine in the machine order, determining a number of unassigned jobs from the job order such that the total processing time for the machine substantially equals the total processing time for the first machine,
      determining a total processing time for the last machine in the machine order based on the unassigned jobs from the job order, and
      determining a maximum total processing time for the plurality of machines;
   determining the first number of jobs that minimizes the maximum total processing time for the plurality of machines; and
   assigning the first number of jobs to the first machine in the machine order and the determined numbers of remaining jobs associated with the first number of jobs to each remaining machine in the machine order.

5. The method of claim 4 wherein the total processing time for a machine is equal to the sum of (i) the product of the number of jobs assigned to the machine and the setup time associated with the machine and (ii) the cumulative job size of the jobs assigned to the machine divided by the processing rate associated with the machine.

6. The method of claim 1 wherein the production environment is a print production environment.

7. A method of balancing job assignments to a plurality of machines in a production environment, the method comprising:
   receiving, by a computing device, a plurality of jobs, wherein each job comprises a job size;
   determining, by the computing device, a job order for the plurality of jobs based on the job size for each job;
   determining an opportunity cost associated with each of a plurality of machines by, for each machine, multiplying a setup time for the machine by a processing rate for the machine;
   determining, by the computing device, a machine order for a plurality of machines based on the opportunity cost associated with each of the plurality of machines;
   determining, by the computing device, one or more job threshold parameters based on the job sizes for the plurality of jobs, the job order, the setup times and the processing rates for the plurality of machines, and the machine order, wherein a number of job threshold parameters is one less than a number of machines in the plurality of machines; and
   assigning, by the computing device, the plurality of jobs to the plurality of machines such that a maximum total processing time for the plurality of machines is minimized, wherein a total processing time for a machine is determined based on the one or more threshold parameters, the setup time associated with the machine, the processing rate associated with the machine and the cumulative job size of the jobs assigned to the machine, wherein the maximum total processing time for the plurality of machines is the largest total processing time for the plurality of machines, wherein the jobs are assigned to the plurality of machines based on the one or more job threshold parameters.

8. The method of claim 7 wherein determining a job order comprises ordering the plurality of jobs from a smallest job size to a largest job size.

9. The method of claim 7 wherein the total processing time for a machine is equal to the sum of (i) the product of the number of jobs assigned to the machine and the setup time associated with the machine and (ii) the cumulative job size of the jobs assigned to the machine divided by the processing rate associated with the machine.

10. The method of claim 7 wherein determining one or more job threshold parameters comprises:
selecting a first value;
assigning a first set of jobs from the job order to a first machine in the machine order, wherein the first set of jobs comprises a number of jobs equal to the first value that are listed first in the job order;
determining a total processing time for processing the first set of jobs on the first machine;
for each of the remaining machines in the machine order other than the last machine in the machine order, determining a number of unassigned jobs from the job order such that the total processing time for the machine substantially equals the total processing time for the first machine;
determining a total processing time for the last machine in the machine order based on the unassigned jobs from the job order;
determining a maximum total processing time for the plurality of machines;
storing, the first value, the numbers of unassigned jobs assigned to each remaining machine, the number of unassigned jobs assigned to the last machine, and the maximum total processing time if the maximum total processing time is less than a previously stored maximum total processing time;
incrementing the first value;
repeating the assigning operation, determining operations, storing operation, and incrementing operation a plurality of times; and
setting the one or more job threshold parameters to the stored first value and the stored number of unassigned jobs, respectively.

11. The method of claim 10 wherein the assigning operation, determining operations, storing operation, and incrementing operation are repeated until the first value equals one more than the number of the plurality of jobs minus the number of the plurality of machines.

12. The method of claim 10 wherein the total processing time for a machine is equal to the sum of (i) the product of the number of jobs assigned to the machine and the setup time associated with the machine and (ii) the cumulative job size of the jobs assigned to the machine divided by the processing rate associated with the machine.

13. A system for balancing job assignments to a plurality of machines in a production environment, the system comprising:
a computing device;
a non-transitory computer-readable storage medium in operable communication with the computing device, wherein the computer-readable storage medium contains one or more instructions that, when executed, cause the computing device to:
receive a plurality of jobs, wherein each job comprises a job size,
determine a job order for the plurality of jobs based on the job size for each job,
determine an opportunity cost associated with each of a plurality of machines by, for each machine, multiplying a setup time for the machine by a processing rate for the machine,
determine a machine order for a plurality of machines based on the opportunity cost associated with each of the plurality of machines, and
assign one or more jobs of the plurality of jobs to each of the plurality of machines such that a maximum total processing time for the plurality of machines is minimized, wherein a total processing time for a machine is determined based on the number of jobs assigned to the machine, the setup time associated with the machine, the processing rate associated with the machine and the cumulative job size of the jobs assigned to the machine, wherein the maximum total processing time for the plurality of machines is the largest of the total processing times for each of the plurality of machines,
wherein the jobs are assigned to each of the plurality of machines based on the job order and the machine order.

14. The system of claim 13 wherein the one or more instructions that, when executed, cause the computing device to determine a job order include one or more instructions that, when executed, cause the computing device to order the plurality of jobs from a smallest job size to a largest job size.

15. The system of claim 13 wherein the total processing time for a machine is equal to the sum of (i) the product of the number of jobs assigned to the machine and the setup time associated with the machine and (ii) the cumulative job size of the jobs assigned to the machine divided by the processing rate associated with the machine.

16. The system of claim 13 wherein the one or more instructions that, when executed, cause the computing device to assign one or more jobs comprise one or more instructions that, when executed, cause the computing device to:
for each of a plurality of first numbers of jobs:
assign the first number of jobs from the job order to a first machine in the machine order,
determine a total processing time for the first machine,
for each of the remaining machines in the machine order other than the last machine in the machine order, determine a number of unassigned jobs from the job order such that the total processing time for the machine substantially equals the total processing time for the first machine,
determine a total processing time for the last machine in the machine order based on the unassigned jobs from the job order, and
determine a maximum total processing time for the plurality of machines;
determine the first number of jobs that minimizes the maximum total processing time for the plurality of machines; and
assign the first number of jobs to the first machine in the machine order and the determined numbers of remaining jobs associated with the first number of jobs to each remaining machine in the machine order.

17. The system of claim 16 wherein the total processing time for a machine is equal to the sum of (i) the product of the number of jobs assigned to the machine and the setup time associated with the machine and (ii) the cumulative job size of the jobs assigned to the machine divided by the processing rate associated with the machine.

18. A method of balancing print job assignments to a plurality of printing devices, the method comprising:
- receiving, by a computing device, a plurality of print jobs, wherein each print job comprises a job size;
- determining, by the computing device, a job order for the plurality of print jobs based on the job size for each print job;
- determining an opportunity cost associated with each of a plurality of machines by, for each machine, multiplying a setup time for the machine by a processing rate for the machine;
- determining, by the computing device, a machine order for a plurality of machines based on the opportunity cost associated with each of the plurality of machines; and
- assigning, by the computing device, one or more print jobs of the plurality of print jobs to each of the plurality of printing devices such that a maximum total processing time for the plurality of printing devices is minimized, wherein a total processing time for a printing device is determined based on the number of print jobs and the cumulative job size of the print jobs assigned to the printing device and the setup time and the processing time associated with the printing device, wherein the maximum total processing time for the plurality of printing devices is the largest of the total processing times for each of the plurality of printing devices, wherein the print jobs are assigned to each of the plurality of printing devices based on the job order and the printing device order.

19. The method of claim 18 wherein determining a job order comprises ordering the plurality of print jobs from a smallest job size to a largest job size.

20. The method of claim 18 wherein the total processing time for a printing device is equal to the sum of (i) the product of the number of print jobs assigned to the printing device and the setup time associated with the printing device and (ii) the cumulative job size of the print jobs assigned to the printing device divided by the processing rate associated with the printing device.

21. The method of claim 18 wherein assigning one or more print jobs comprises:
- for each of a plurality of first numbers of print jobs:
  - assigning the first number of print jobs from the job order to a first printing device in the printing device order,
  - determining a total processing time for the first printing device,
  - for each of the remaining printing devices in the printing device order other than the last printing device in the printing device order, determining a number of unassigned print jobs from the job order such that the total processing time for the printing device substantially equals the total processing time for the first printing device,
  - determining a total processing time for the last printing device in the printing device order based on the unassigned print jobs from the job order, and
  - determining a maximum total processing time for the plurality of printing devices;
- determining the first number of print jobs that minimizes the maximum total processing time for the plurality of printing devices; and
- assigning the first number of print jobs to the first printing device in the printing device order and the determined numbers of remaining print jobs associated with the first number of print jobs to each remaining printing device in the printing device order.

\* \* \* \* \*